United States Patent [19]

Tate et al.

[11] Patent Number: 5,499,368
[45] Date of Patent: Mar. 12, 1996

[54] SCALED DEPICTION OF INFORMATION FROM A DATABASE

[75] Inventors: Bruce A. Tate; Shih-Gong Li, both of Austin, Tex.

[73] Assignee: International Business Machines Corporation, Armonk, N.Y.

[21] Appl. No.: 348,003

[22] Filed: Dec. 1, 1994

Related U.S. Application Data

[63] Continuation of Ser. No. 837,121, Feb. 19, 1992, abandoned.

[51] Int. Cl.$^6$ .................................................. G06F 17/30
[52] U.S. Cl. ................... 395/600; 395/161; 364/948.22; 364/974.6; 364/977.1; 364/DIG. 2
[58] Field of Search ..................... 364/DIG. 1, DIG. 2; 395/600, 12, 51, 52, 155, 160, 161

[56] References Cited

U.S. PATENT DOCUMENTS

| | | | |
|---|---|---|---|
| 4,479,196 | 10/1984 | Ferrer et al. | 364/900 |
| 4,506,326 | 3/1985 | Shaw et al. | 364/300 |
| 4,752,889 | 6/1988 | Rappaport et al. | 364/513 |
| 4,805,134 | 2/1989 | Calo et al. | 364/900 |
| 5,010,478 | 4/1991 | Deran | 364/200 |
| 5,047,918 | 9/1991 | Schwartz et al. | 364/200 |
| 5,065,338 | 11/1991 | Phillips et al. | 395/51 |
| 5,133,045 | 7/1992 | Gaither et al. | 395/51 |
| 5,265,246 | 11/1993 | Li et al. | 395/600 |
| 5,295,242 | 3/1994 | Mashruwala et al. | 395/159 |
| 5,299,287 | 3/1994 | Tsuruta et al. | 395/51 |

OTHER PUBLICATIONS

Engineering with Computers, User Interfaces for Structural Engineering Relational Data Base, H. Craig Howard and Cynthia Stotts Howard, 1988, pp. 239–249.

*Primary Examiner*—Thomas G. Black
*Assistant Examiner*—Maria N. Von Buhr
*Attorney, Agent, or Firm*—Lawrence K. Stephens; Diana L. Roberts

[57] ABSTRACT

A method, system and program providing scaled depiction of information from a database. In a preferred form, tables and lists are obtained from a database and used to build a data structure. The data structure is employed to define various relationships between the dynamic data and the database information using a numberline to display ranges of information to a user. The system employs a query interface and a relational database to provide an ergonomic, natural display system for a database user.

15 Claims, 7 Drawing Sheets

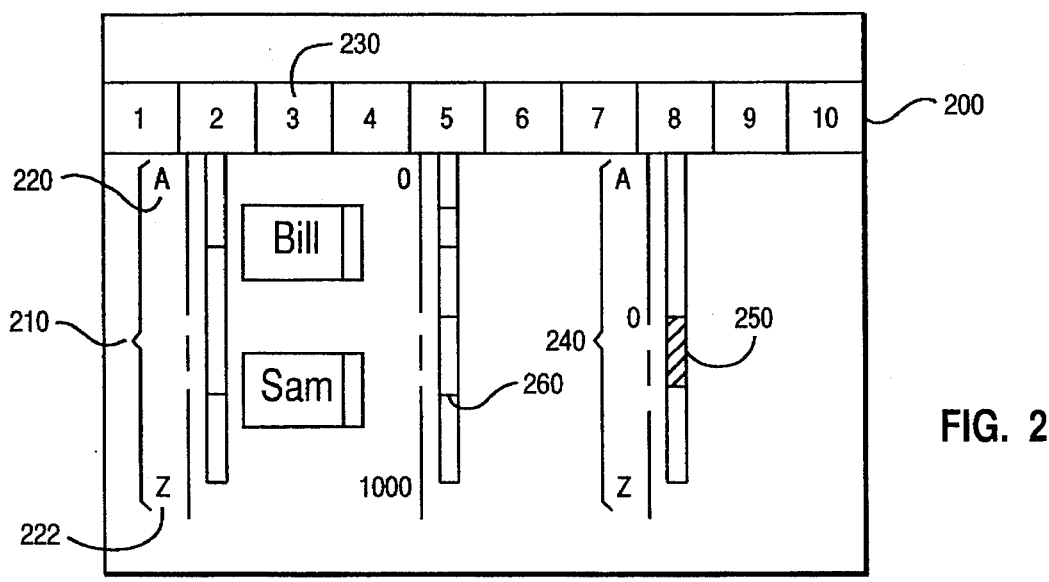
FIG. 2
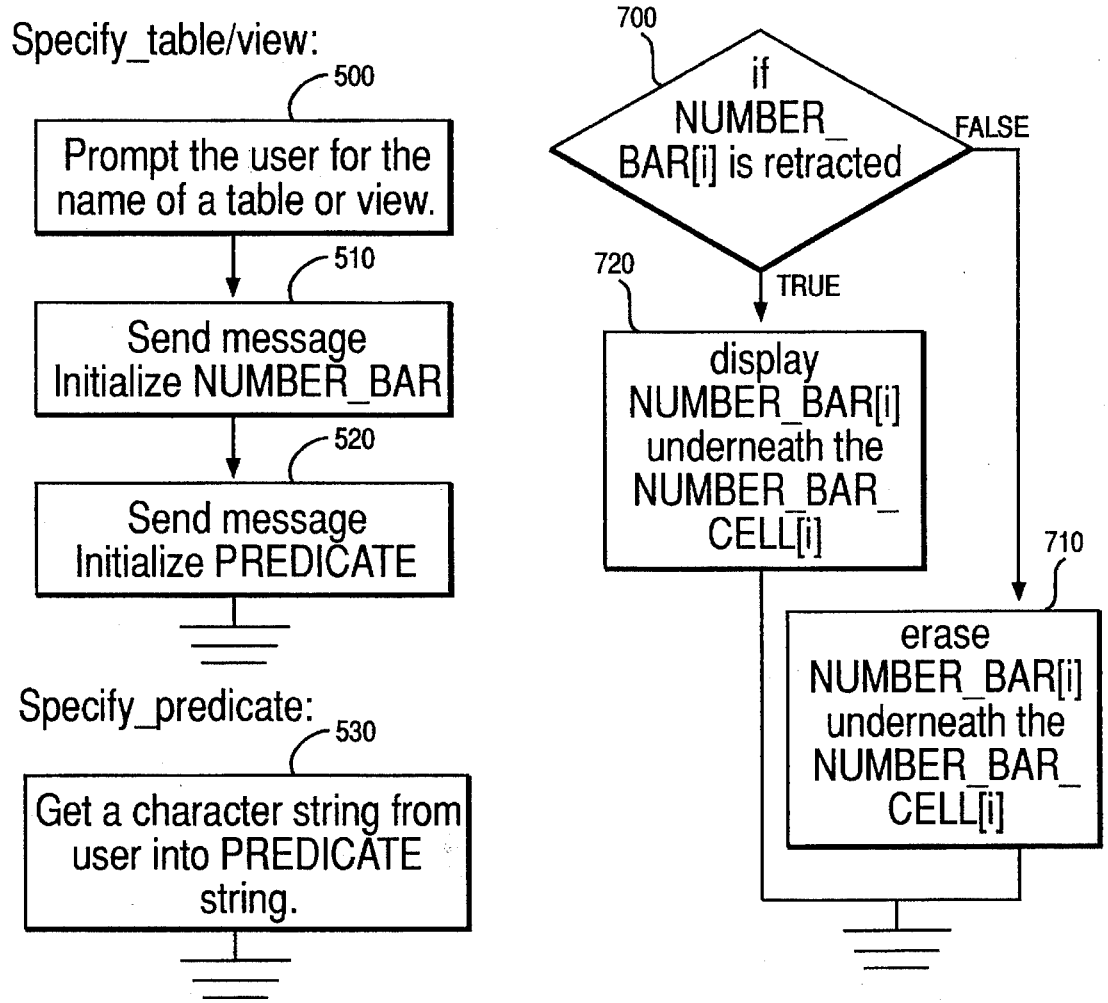
FIG. 5
FIG. 7

Number_bar:
Initialize

[For each column in Table_View that is the table or view chosen by the user for this particular query] — 600

↓

[fill in NUMBER_BAR[i] structure:
get COLUMN_NAME from the DBM
get COLUMN_TYPE from the DBM] — 610

↓

620 — if type is 'char' — NO → min_value = SELECT MIN(COLUMN_NAME) FROM Table_View — 622

YES ↓

MIN_VALUE = 'a' — 630

↓

MAX_VALUE = 'zzzzzzzzz' — 640 max_value = SELECT MAX(column_name) FROM Table_View — 624

↓ sub_range = NULL — 650

↓ for each subgroup in the concentration scale (NUMBER_OF_ELEMENTS[j]) — 660

↓ compute endpoints (min_c and max_c) of concentration subgroup — 670

↓

NUMBER_OF_ELEMENTS[i] =
    SELECT count (COLUMN_NAME[i])
    FROM Table_View
    WHERE COLUMN_NAME BETWEEN
    (min_c, max_c) — 680

FIG. 6

User drags range from number_line[i]; drops range off of number_line[i]: Used to delete range

```
delete appropriate range node from the SUBRANGE
linked list in NUMBER_LINE[i]
```
— 900

Mouse click on number_line[i] or range[j]: Used to set/reset selected status 910
if NUMBER_LINE[k] or RANGE[l] already has selected status 920
display NUMBER_LINE[k] or RANGE[l] with normal status Display NUMBER_LINE[i] or RANGE[j] with selected status.
930

Predicate_Window:
 Building PREDICATE string:

```
PREDICATE=
numberline[1] + "AND"
numberline[2] + "AND"
...         + "AND"
numberline[NUMBER_OF_COLUMNS]
```
— 940

("+" represents concatenation)

FIG. 9

SCALED DEPICTION OF INFORMATION FROM A DATABASE

Please amend the specification by inserting before the first line the sentence: This is a continuation of application Ser. No. 07/837,121 filed Feb. 19, 1992, now abandoned.

FIELD OF THE INVENTION

This invention generally relates to improvements in database applications and more particularly to using a series of numberlines to display information from a database.

BACKGROUND OF THE INVENTION

Databases have become the subject of significant recent interest, not only because of the increasing volume of data being stored and retrieved by computerized databases, but also by virtue of the data relationships which can be established during the storage and retrieval processes. Most of the interest in databases has concerned user demands for an improved ergonomic interface.

One aspect of improved ergonomics is the ability to convey information from a database in a meaningful way to a user. An early attempt at this type of processing is disclosed in U.S. Pat. No. 4,506,326 to Shaw et al, entitled, APPARATUS AND METHOD FOR SYNTHESIZING A QUERY FOR ACCESSING A RELATIONAL DATABASE. The patent disclosed a method and apparatus for preparing a linear query to access a relational database and obtain information for display to a user in a linear, sequential report of alphanumeric information.

Structured Query Language (SQL), and in particular ANSI SQL, has become a preferred language media for communicating queries to relational databases. As a consequence, there presently exist thousands of relational databases and thousands of related queries directed to such databases. Given an investment in such databases and queries, migration is not only a desirable feature, but a substantially necessary capability for new relational database systems and methods.

With the growing prevalence of relational databases, communication networks and workstations, the training and experience of a representative system user has decreased in relation to the resources available. The dilemma created by these various events is threefold. First, there exists an established and valuable base of queries formulated with classical SQL expressions. Second, there is a growing usage of relational databases and networks accessing their information. The end users of such databases are routinely less proficient in the very tools needed to efficiently and accurately access the relational database information. Finally, users of database access methods do not receive direct feedback of changes based on their manipulation of the database. Thus, a distinct need exists for methods, systems and programs which convert query statements into visual representations understandable by novice database users, and, in the compliment, which convert graphically or visually represented queries into SQL format statements usable in existing databases and network environments.

An example of a dynamic, graphical display for a knowledge base application is found in U.S. Pat. No. 4,752,889 to Neuron Data. The patent discloses a graphical tree structure depiction of a knowledge base that is updated after changes are made to the database via user line commands. None of the prior art references disclose or suggest a graphic Interface for directly manipulating a database and reflecting the changes in a dynamic manner.

SUMMARY OF THE INVENTION

Accordingly, it is a primary object of the present invention to provide a method and system for conveying database information to a user using a numberline to display data on a business graph.

These and other objects of the present invention are accomplished by the operation of a detailed logic in the memory of a processor. The processor accesses a data structure to determine the current status of a database and displays the logical relationships of the information stored in the database graphically using a numberline to convey ranges of data within a database field. A user employs a pointing device to select and change portions of a database query and its logical relationships via the graphic user interface. The selection and changes are dynamically applied via a query to the relational database to retrieve information from the database, update the underlying data structures and reflect the new information graphically on the display.

BRIEF DESCRIPTION OF THE DRAWINGS

FIG. 2 is an illustration of a display in accordance with the subject invention;

FIG. 5 is a flowchart depicting the detailed logic in accordance with the subject invention;

FIG. 6 is a flowchart depicting the detailed logic in accordance with the subject invention;

FIG. 7 is a flowchart depicting the detailed logic in accordance with the subject invention;

FIG. 9 is a flowchart depicting the detailed logic in accordance with the subject invention.

DETAILED DESCRIPTION OF THE INVENTION

Queries which obtain information from relational databases are conventionally defined with ANSI standard Structure query Language (SQL) statements. These statements define in computer recognizable terms the tables from which the data is to be extracted, the columns of interest, the conditions rows must satisfy, what columns are to be included, how the select columns are to be grouped, the order of the columns, distinctiveness constraints in the columns, connections of data within tables, and lower level or subqueries to be integrated into the base queries. A text describing SQL and its uses appears in the IBM Operating Systems/2 Extended Edition Database Manager Structured Query Language (SQL) Concepts booklet published by IBM Corporation in 1991.

Query By Example (QBE) is a user interface for accessing a relational database system. Instead of entering linear statements, the user can make entries in tables to specify a definition for a query. In QBE design, tables chosen to be included in a query are displayed by showing their columns in a horizontal style. The user is prompted to enter a condition or other specification under a column for query definition. When multiple entries are specified, the screen layout grows into a matrix format.

Although both QBE and the disclosed invention allow the user to specify conditions on a column through a display-driven user interface, the disclosed invention facilitates the process by providing more information about data of a column using a numberline showing the data of a column in a concentration scale and allowing a user to specify ranges directly on the numberline for generating conditions automatically. Using the numberlines, the user is not required to enter any form of text to specify a condition.

The article "User Interfaces for Structural Engineering Relational Database" by Howard et al as appeared in *Engineering With Computers*, 1988, pages 239–249, recognized the importance of bidirectional translation between a text based query, the defined Engineering Query Language and graphical representations. However the article did not disclose how such desirable objectives could be accomplished. The article recognized the potential need for translating relatively complex query formulations and applying them directly from a graphical interface to a database, but made no attempt to present a solution. In contrast, the present invention defines a method, system and program for accomplishing these desirable goals and doing so with the resources to handle complex formulations, Including, but not limited to, the definition of a concentration scale and displaying data in a numberline with concentration information on the screen to assist in identifying and selecting a range for a particular column.

Figure 1:
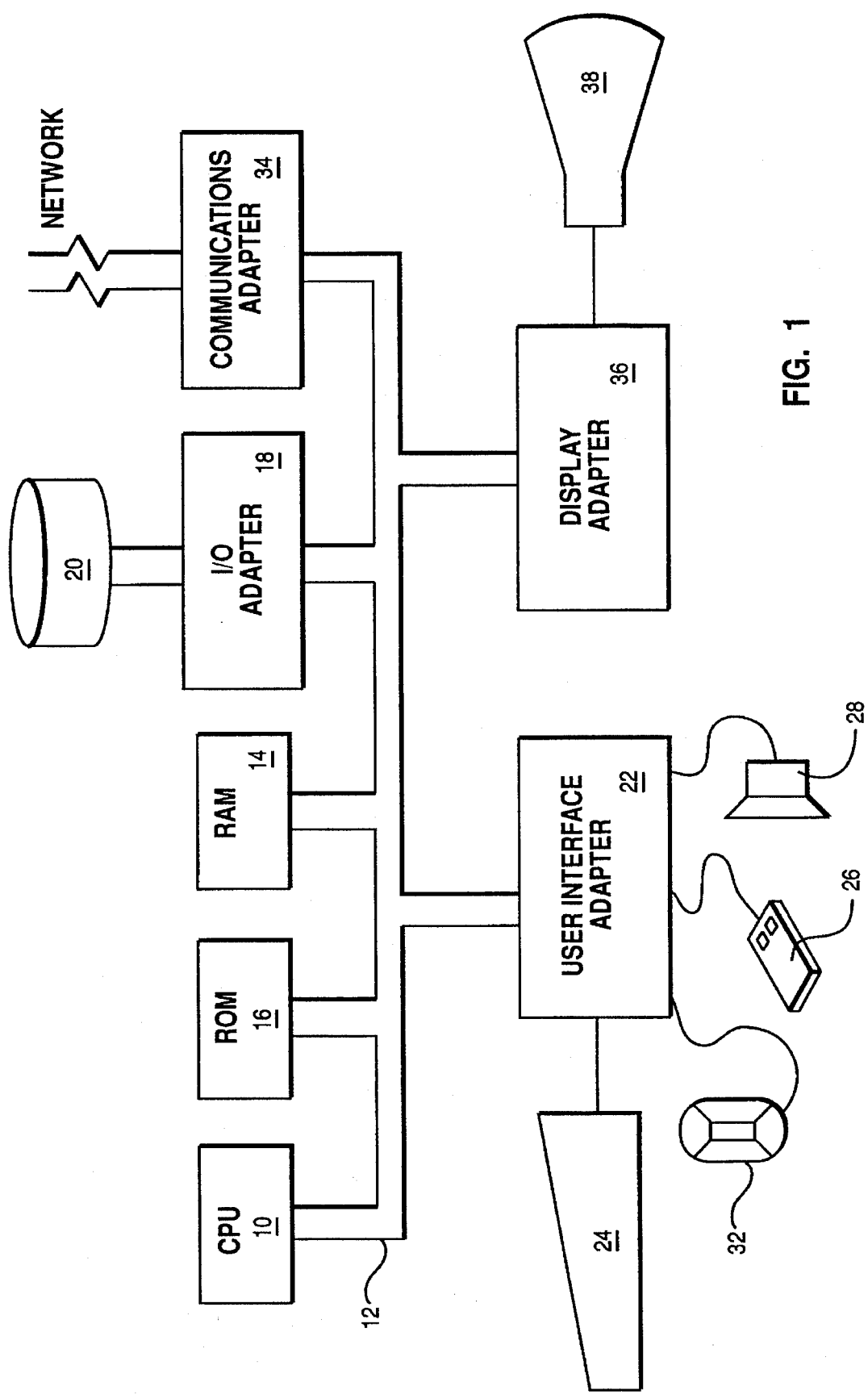
FIG. 1 is a block diagram of a personal computer system in accordance with the subject invention.

The invention is preferably practiced in the context of a relational database such as is available with Database Manager in the Extended Services (TM) software program available from IBM Corporation, A representative hardware environment is depicted in FIG. 1, which illustrates a typical hardware configuration of a workstation in accordance with the subject invention having a central processing unit 10, such as a conventional microprocessor, and a number of other units interconnected via a system bus 12. The workstation shown in FIG. 1 includes a Random Access Memory (RAM) 14, Read Only Memory (ROM) 16, an I/O adapter 18 for connecting peripheral devices such as disk units and tape drives 20 to the bus, a user interface adapter 22 for connecting a keyboard 24, a mouse 26, a speaker 28, a microphone 32, and/or other user interface devices such as a touch screen device (not shown) to the bus, a communication adapter 34 for connecting the workstation to a data processing network and a display adapter 36 for connecting the bus to a display device 38.

Existing query systems examine and display a large amount of data in a text-based format. Since query languages were not designed with graphic solutions in mind, they are not well suited for iterative processing that accompanies detailed data analysis. So, if a user requires an examination of a database display in more detail than originally presented, the user must create a new query and run the new query to obtain the required additional information. Existing query systems have no information about data concentrations and inadequate range specification.

A numberline is an ideal representation for displaying data on a business graph. Forming a query using a series of number lines is a natural extension to current query processing. Each numberline represents an attribute or an expression corresponding to elements of a WHERE clause in a SQL SELECT statement. In forming a WHERE clause, different numberlines have an AND relationship and different ranges within the same line would have an OR relationship. The components of the numberline query are:

NUMBERLINE (FIG. 2–210)

This is an entity like a Presentation Manager scroll bar. Abstractly, the numberline represents an entire range of data within a database field. Queries are represented by specifying a series of subranges on a numberline.

ATTRIBUTE NAME (FIG. 2–230)

A name of one of the columns in one of the joined tables, or a column function/expression of several columns in the table. For example, for a query on a single table with columns "A" and "B", some attribute names would be "A", "B" and "A+B".

CONCENTRATION SCALE (FIG. 2–240)

This is a line next to the numberline consisting of various shades of grey. The darker the grey, the heavier the concentration of database values corresponding to the numberline values. For example, for a high scoring class of students, a numberline for the grade attribute would have a dark grey next to the "A" value on the numberline, and a lighter grey next to the "F" value.

SUBRANGES (FIG. 2–250)

These are the ranges that the user wants included in the graph or report. A subrange will be shown by coloring the portion of the numberline included in the subrange a different color from the rest of the numberline. For example, to show a list of all retired persons, a black numberline is colored yellow above the age of 65.

SUBRANGE SEPARATORS (FIG. 2–260)

These are dots and partial dots that are used to partition the numberline into subranges. A solid dot is used as the endpoint of a subrange when the endpoint is to be included. An arrow is used at the top or bottom of a numberline when new values past the endpoint would logically be included. New subrange separators may be created by double clicking on a numberline. Two subrange separators are created by default. Both can be dragged and dropped at the desired location. When a separator is created, an entry field is created beside it. Dragging the separator or changing the data in the entry field can be employed to reposition a separator. The type of separator (dot or partial) can be changed by clicking on a box next to the entry field. A user may also click on arrows at the top and the bottom of a numberline to move to the next or previous existing database value.

PREDICATE WINDOW - A predicate window is a window for defining logical combinations of queries to select a particular range of values from a database. The predicate window displays the default expression that is automatically built based on a subrange of a particular numberline. The predicate window allows the user to create and modify conditional expressions which would not otherwise fit within the framework of a numberline. The semantics of the NUMBERLINE expression are NUMBERLINE(n) or NUMBERLINE(attribute), where the logical value returned follows the rules laid out below.

TRUE for each tuple in which the corresponding attribute value falls into any subrange specified In the corresponding numberline, If no predicate is supplied, then the default expression is "NUMBERLINE(1) AND NUMBERLINE(2) AND . . . NUMBERLINE(N)", where N is the total number of numberlines.

Thus, different numberlines share a logical AND relationship and different ranges within the same numberline share a logical OR relationship.

The invention also provides for the effective placement of numberlines. The concept of a number bar is introduced. The number bar is located directly under the action bar at label 200 of FIG. 2. There is a number bar entry for each attribute which a user has defined. Double clicking on the number bar selects the numberline corresponding to the number bar attribute. A vertical list of fields can be substituted for the number bar, and the number bar can appear horizontally. Single clicking on a number bar entry advances or retracts a number line. An advanced number bar appears on the screen as a vertical line below the number bar entry.

In FIG. 2, the second numberline is selected 210. The second, fifth and eighth numberlines are advanced. Note that for the selected numberlines, the values corresponding to the subrange separators for the selected range are displayed at 220 end 222. Appropriate tick marks could also be displayed corresponding to finer granularities of division. For example, a tick mark for each letter in the alphabet. Subranges are displayed in a different color than other parts of a numberline. Since numberlines do not take up any screen space when they are retracted, they can share display area with a graph. This makes interactive, iterative queries easier to create.

The implementation of a numberline is facilitated by externalizing the index values for a database to make the concentration scale and the entry fields feasible. Indexes ape created as new fields ape initialized. A query containing the data values for a field can be stored in a temporary file or a holding area. The temporary query result can then be used to create concentration scales and indexes. Also, if the temporary file was saved, then it does not require creation for subsequent queries when extensive database changes have occurred.

DETAILED LOGIC

The detailed data structures and flow charts that Implement the invention ape presented below. Data structures contain the table or view, state of the numberlines, including the concentration scale corresponding to a particular numberline, and the ranges that ape currently specified on a given numberline, and the predicate that is specified in the predicate window. The table or view data structure of the preferred embodiment is the standard SQL data structure. However, one of ordinary skill in the art will readily comprehend that other database managers can practice the Invention by using the particular data structure common to the database.

Figure 3:
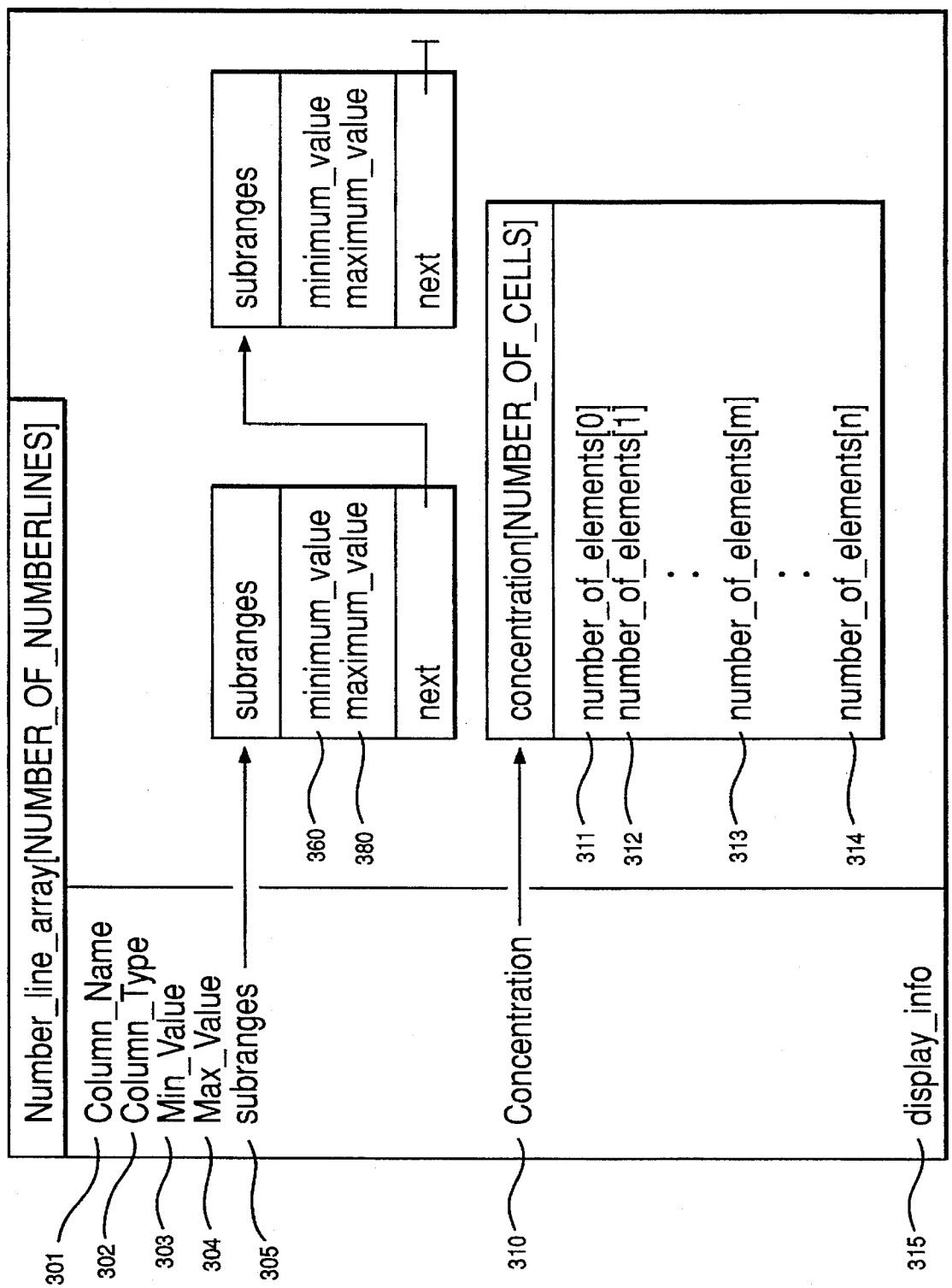
FIG. 3 is a detailed illustration of a data structure in accordance with the subject invention.

The numberline data structure is shown in FIG. 3. Column_name 301 is the name of the database column or expression of columns in the table or view corresponding to the particular numberline. Column_type 302 is the type of the data value of column_name 301. Min_value 303 is the minimum allowable value for this numberline. Max$_{13}$value 304 is the maximum allowable value for this numberline. Subranges 305 is a pointer to a linked list of subranges that ape specified on this numberline by the user for defining predicates used in the WHERE clause of a query.

Minimum_value 360 is a data value corresponding to the uppermost (minimal) point of the subrange on the numberline. Maximum_value 380 is a data value corresponding to the lowermost (maximal) point of the subrange on the numberline. Concentration 310 is a count of the column_name 301 values in incremental ranges along the numberline. The values ape a histogram mapping the nonlinear distribution of the column_name values to a linear numberline. The size of the cells in this array can be determined by the user or by the display software based on the size of the display/window.

Number_of_elements[0] 311 contains a count of the column_name 301 values that fall in the range of (minimum_value 360 to minimum_value 360+ cell_size - 1). Number_of_elements[1] 312 contains a count of the column_name 301 values that fall in the range of {minimum_value 360+ cell_size to minimum_value 360+cell_size * 2-1}. Number_of_elements[n] 313 contains a count of the column_name 301 values that fall in the range of {minimum_value 360+cell_size * m to minimum_value 360+ cell_size * (m+1) - 1}. Number_of_elements[n] 314 contains a count of the column_name 301 values that fall in the range of {maximum_value 380–cell_size+1 to maximum_value 380 }. Finally, display_into 315 contains all the information necessary to display the numberline and will vary based on the implementation of the user interface, and the predicate data structure consists of a logical grouping of query information designed to extract a specific range of information from a database.

Figure 4:
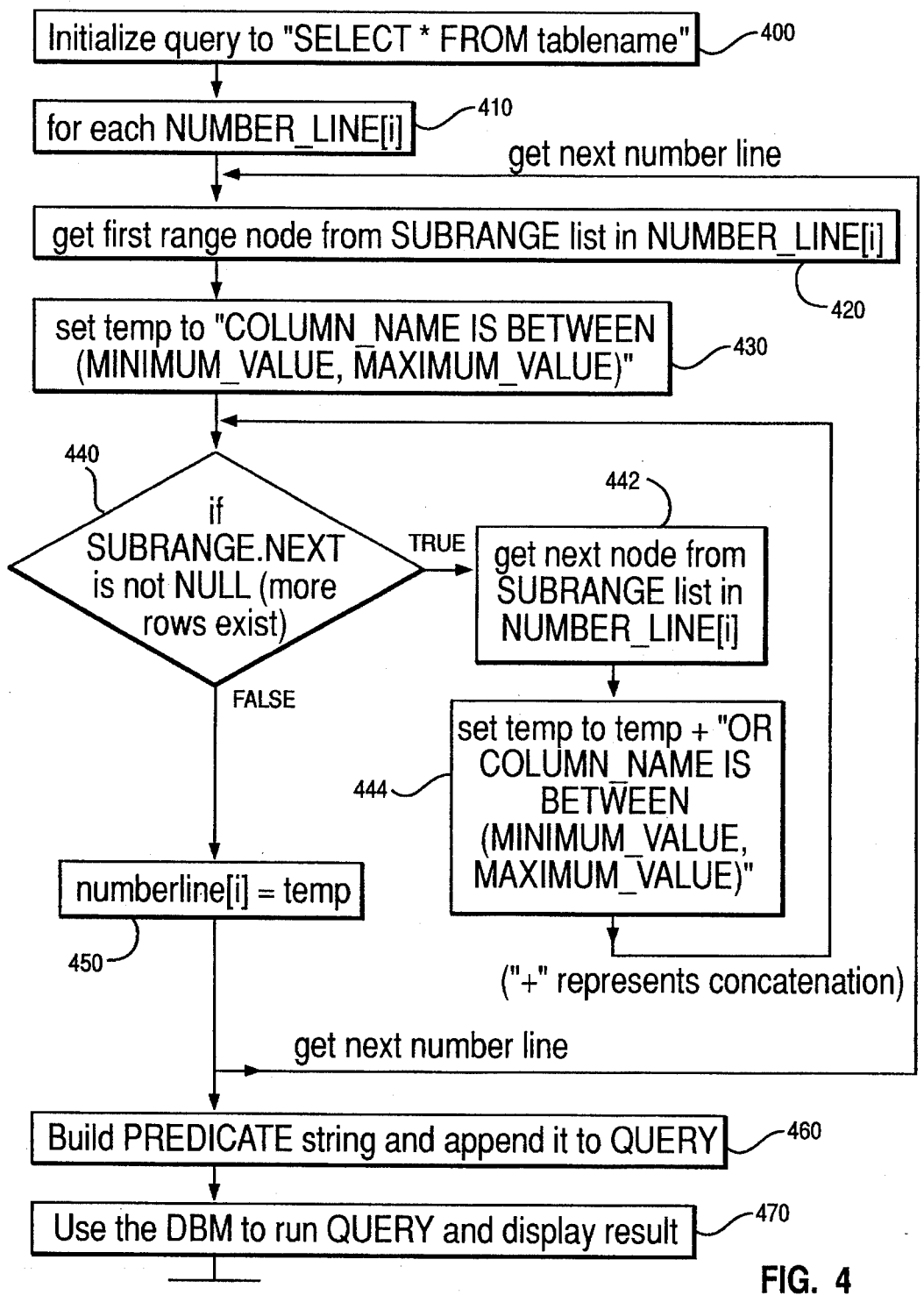
FIG. 4 is a flowchart depicting the detailed logic in accordance with the subject invention.

FIG. 4 is a flowchart depicting the detailed logic in accordance with the subject invention. Processing commences at function block 400 where a SQL query is initialized to select all items from a particular tablename. At function block 410 a loop is initialized to process each numberline in the data structure detailed in FIG. 3. Next, function block 420 shows the set up for subrange processing and function block 430 prepares a text message detailing the min and max values. Then, a test is performed at decision block 440 to determine if the next subrange value is not null. If it is not null, then in function block 442 the next node is obtained from the subrange list, the message indicating the column name's min and max values is updated in function block 444, and control returns to decision block 440 to determine if additional subranges exist. When all the subranges are processed as determined by encountering a null value at decision block 440, then control passes to function block 450 to set the current numberline array equal to the temporary message and control passes to function block 420 to process the next numberline.

When all numberlines have been processed, control passes to function block 460 to build a predicate string and append it to the original query. Then, at function block 470, the data base manager runs the query and the results are displayed to the user on a display like that shown in FIG. 1 at 38.

FIG. 5 is a flowchart depicting the detailed logic table/view and predicate processing in accordance with the subject invention. To assist a user in displaying a particular table or view, the user is first prompted at function block 500 to enter the name of a table or view. Then, at function block 510, a message is sent to initialize the number_bar as detailed in FIG. 6 and a message is sent to initialize the predicate as shown in function block 520. To specify a predicate, a user is prompted as shown in function block 530 to enter a character string to replace the predicate string.

FIG. 6 is a flowchart depicting the detailed logic of number_bar initialization in accordance with the subject invention. Processing commences at function block 600 where a loop is initialized to process each column in table_view. The processing includes filling in the number_bar structures by getting the column_names and column_types as shown in function block 610 and determining if the type is character in decision block 620. If the type is not character, then the min_value is set from the table_view table in function block 622, the max_value is set from the table_view table in function block 624 and control passes to function block 650. If the type is character in decision block 620, then the min_value is set to "a" at function block 630 and the max_value is set to "ZZZZZZZZZZZZZZ" at function block 640 corresponding to alpha character ranges.

Function block 650 initializes the sub_range to a null value. Then, in function block 660, a loop is commenced to process each subgroup in the concentration scale. The processing includes computation of endpoints in function block 670 and number_of_elements in function block 680.

FIG. 7 is a flowchart depicting the detailed logic of number_bar update in accordance with the subject invention. Processing commences at decision block 700 where a test is performed to determine if a number_bar is retracted. If the number_bar is retracted, then a particular number_bar is displayed under the corresponding number_bar_cell at 720. If the number_bar is not retracted, then the number_bar is erased from the particular number_bar_cell at 710. Then, control is returned from the calling point.

Figure 8:
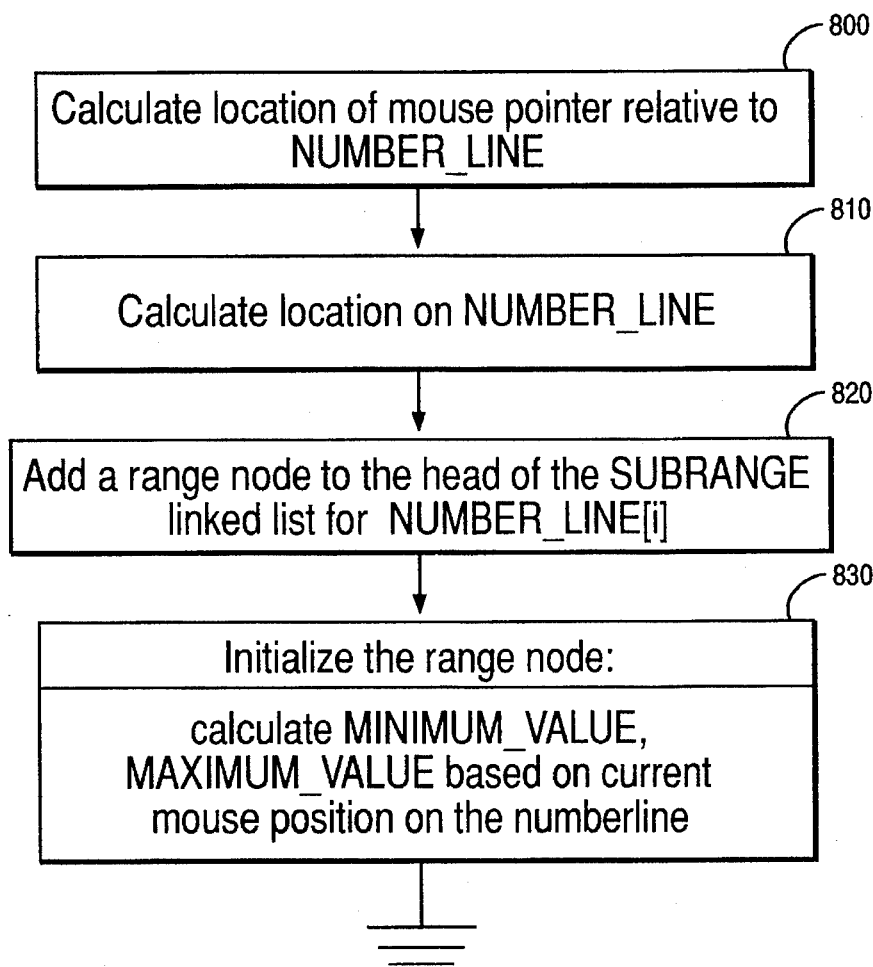
FIG. 8 is a flowchart depicting the detailed logic in accordance with the subject invention.

FIG. 8 is a flowchart depicting the detailed logic of initializing a range node in accordance with the subject invention. Processing commences at function block 800 where the location of the mouse pointer relative to a numberline is determined. Then, at function block 810, the location on the numberline is calculated and a range node is added in function block 820. Finally, at function block 830, the range node is initialized by calculating the minimum_value and the maximum_value based on the current mouse positioning on the numberline.

FIG. 9 is a flowchart depicting the detailed logic of range dragging, range processing and predicate window processing in accordance with the subject invention. Processing commences at function block 900 when a user drags a range from a numberline and drops the range at another numberline to delete a range. The appropriate range node from the subrange is deleted. If a user clicks on a numberline or a range, the selected status is reset based on a test performed at decision block 910 to determine that a status has been selected. Then, in function block 920 the numberline or range is displayed with a normal status and in function block 930. To build a predicate window, the numberlines are concatenated together as shown in function block 940.

Figure 10:
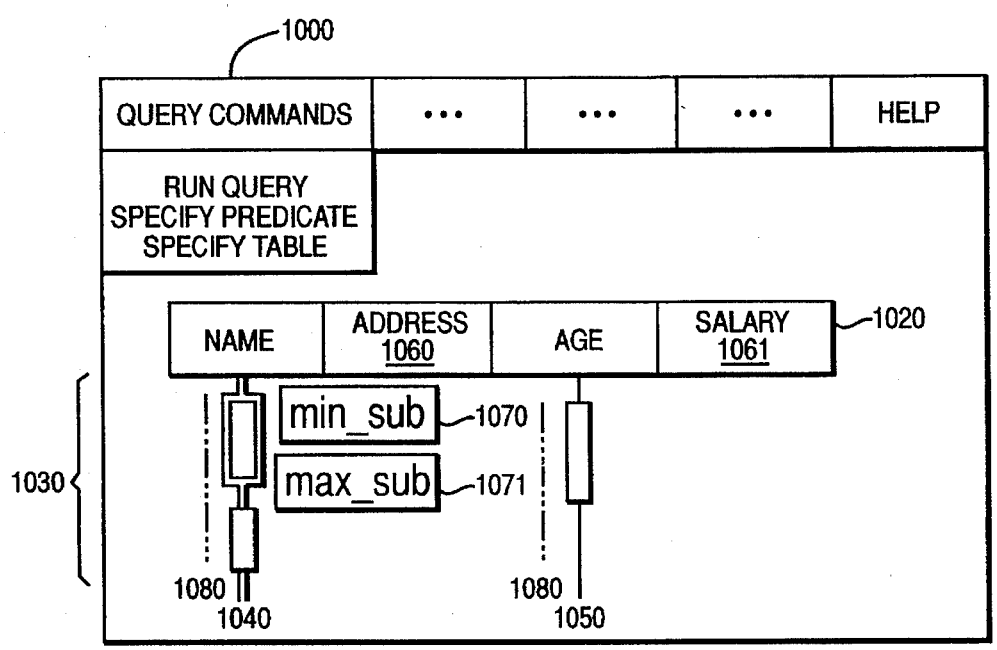
FIG. 10 is an illustration of a display in accordance with the subject invention.

FIG. 10 is an illustration of a display in accordance with the subject invention. Label 1000 is on the action bar where commands required from this or similar interfaces are invoked.

Such commands include Run Query, specify Predicate, Specify Table or View. 1020 is a label on the number bar which has cells corresponding to each table and view column. Label 1030 spans the number bars in their normal state. 1040 is a label attached to a selected number bar which is highlighted to indicate a selected status. 1050 is a attached to an unselected number bar which is displayed without a selected emphasis. A number bar must be selected to enable manipulations to occur. 1060 and 1061 are labels attached to a retracted number bar. Retracted number bars free up space similar to pull down menus in a windowing system. Labels 1070 and 107I are range fields which indicate the minimum and maximum values in a particular range. Finally, label 1080 is attached to a concentrations scale to indicate concentrations of values on the number bar along a particular axis.

While the invention has been described in terms of a preferred embodiment in a specific system environment, those skilled in the art recognize that the invention can be practiced, with modification, in other and different hardware and software environments within the spirit and scope of the appended claims.

Having thus described our invention, what we claim as new, and desire to secure by Letters Patent is:

1. An apparatus for displaying a plurality of columns from a database as a plurality of numberlines, said numberlines used to generate a database query, comprising:

a processor;

use controls;

in response to said user controls, means for controlling said processor to retrieve a plurality of columns from said database;

a display for displaying a range of values of each of said retrieved columns, each of said ranges being displayed as one of said numberlines;

in response to said user controls, means for controlling said processor to create at least one subrange of values on each of said numberlines; and means for controlling said processor to build a database query from said subranges.

2. The apparatus as recited in claim 1, wherein said means for controlling said processor to create at least one subrange comprises:

in response to said user controls, means for controlling said processor to create at least one additional subrange of values on each of said numberlines.

3. The apparatus as recited in claim 2, wherein said means for controlling said processor to build a database query comprises:

means for logically ORING said subrange with said at least one additional subrange on each numberline to generate a database subquery for each numberline; and means for logically ANDING each of said database subqueries to generate said database query.

4. The apparatus as recited in claim 1, including means for displaying a concentration scale adjacent to each of said numberlines, each of said concentration scales indicating a concentration of said values within each of said numberlines.

5. The apparatus as recited in claim 1 wherein said means for controlling said processor to retrieve a plurality of columns comprises:

in response to said user controls, means for retrieving at least one table from said database, said table having one or more columns;

means for retrieving a column name and column type for each of said columns;

means for determining the minimum and maximum value for each of said columns;

means for initializing a number bar by positioning each of said column names on said number bar; and in response to said user controls, means for retrieving at least one of said columns on said number bar.

6. The apparatus as recited in claim 5 wherein said display for displaying a range of values further comprises:

said display for displaying said minimum and maximum values for each of said columns on each of said numberlines.

7. The apparatus as recited in claim 6 wherein said means for controlling said processor to create at least one subrange comprises:

said user controls for positioning a pointer on said numberline;

said user controls for activating said pointer to create a subrange separator, said subrange separator comprising a double dot; and in response to said user controls, said pointer for moving either dot of said double dot to change said subrange.

8. A method for controlling a computer system, having at least user controls to control a pointer and a display, to display at least one column from a database as a numberline, said numberline used to generate a database query, comprising the computer-implemented steps of:

(a) in response to said user controls, retrieving at least one column from said database;

(b) displaying a range of values for said retrieved column as a numberline on said display;

(c) in response to said user controls, creating at least one subrange of values on said numberline;

(d) repeating said steps (a) through (c) until no more columns are retrieved; and (e) building a database query using each of said subranges.

9. The method as recited in claim 8, wherein said step (c) comprises the step of:

in response to said user controls, creating at least one additional subrange of values on each of said numberlines.

10. The method as recited in claim 9, wherein said step of building a database query comprises the steps of:

logically ORING said subrange with said additional subrange on each numberline to generate a database subquery for each numberline; and logically ANDING each of said database subqueries to generate said database query.

11. The method as recited in claim 8, including the step of displaying a concentration scale adjacent to each of said numberlines, each of said concentration scales indicating a concentration of said values within each of said numberlines.

12. The method of claim 8 wherein said step (a) comprises the steps of:

in response to said user controls, retrieving at least one table from said database, said table having one or more columns;

retrieving a column name and column type for each of said columns;

determining the minimum and maximum value for each of said columns;

initializing a number bar by positioning each of said column names on said number bar; and in response to said user controls, retrieving one or more of said columns on said number bar.

13. The method of claim 12 wherein said step (b) comprises the following step:

displaying said minimum and maximum values of each of said columns on each of said numberlines.

14. The method of claim 8 wherein said step (c) comprises the steps of:

(f) in response to said user controls, positioning said pointer on at least one of said numberlines;

(g) in response to said user controls, activating said pointer to create a subrange separator, said subrange separator comprising a double dot;

(h) in response to said user controls, moving either of said dots according to the movement of said pointer to change said subrange; and (i) in response to said user controls, repeating said steps (f) through (h) to create additional subranges.

15. An apparatus for displaying at least one column from a database as a numberline, said numberline used to generate a database query, comprising:

a processor;

user controls;

in response to a first command from said user controls, said processor for retrieving at least one column from said database;

a display for displaying a range of values for said retrieved column, said range being displayed as a numberline;

in response to a second command from said user controls, said processor for creating at least a first subrange of values on said numberline; and said processor for building a database query from said subrange.

* * * * *